(12) United States Patent
Liu et al.

(10) Patent No.: US 10,289,253 B2
(45) Date of Patent: May 14, 2019

(54) TOUCH CONTROL DISPLAY PANEL, DRIVING METHOD AND TOUCH CONTROL DISPLAY DEVICE

(71) Applicants: Shanghai Tianma Micro-electronics Co., Ltd., Shanghai (CN); Tianma Micro-electronics Co., Ltd., Shenzhen (CN)

(72) Inventors: Liang Liu, Xiamen (CN); Yuanhang Li, Xiamen (CN); Zuoyin Li, Xiamen (CN); Yihua Zhu, Xiamen (CN); Shoujin Cai, Xiamen (CN); Feng Lu, Shanghai (CN); Qijun Yao, Shanghai (CN)

(73) Assignees: Shanghai Tianma Micro-electronics Co., Ltd., Shanghai (CN); Tianma Micro-electronics Co., Ltd., Shenzhen (CN)

( * ) Notice: Subject to any disclaimer, the term of this patent is extended or adjusted under 35 U.S.C. 154(b) by 100 days.

(21) Appl. No.: 15/271,693

(22) Filed: Sep. 21, 2016

(65) Prior Publication Data
US 2017/0010745 A1    Jan. 12, 2017

(30) Foreign Application Priority Data
Jun. 20, 2016 (CN) .......................... 2016 1 0443116

(51) Int. Cl.
G06F 3/044 (2006.01)
G06F 3/041 (2006.01)

(52) U.S. Cl.
CPC ............ G06F 3/044 (2013.01); G06F 3/0412 (2013.01); *G06F 2203/04105* (2013.01); *G06F 2203/04112* (2013.01)

(58) Field of Classification Search
CPC ............................................ G06F 3/041–3/047
See application file for complete search history.

(56) References Cited

U.S. PATENT DOCUMENTS 8,823,399 B1* 9/2014 Bharathan ................ G01R 1/00
324/684
2015/0378495 A1* 12/2015 Losh ..................... G06F 3/0416
345/174
(Continued)

FOREIGN PATENT DOCUMENTS

CN    102236447 A    11/2011
CN    103293780 A     9/2013
(Continued)

*Primary Examiner* — Gene W Lee
(74) *Attorney, Agent, or Firm* — Anova Law Group, PLLC

(57) ABSTRACT

A touch control display panel, a touch control display device and a touch control display panel driving method are provided. The touch control display panel comprises a first substrate; a second substrate arranged opposite to the first substrate; a plurality of first electrodes disposed on the first substrate, a plurality of second electrodes disposed in a gap between two first electrodes and electrically insulated from the first electrodes, wherein the plurality of first electrodes and the plurality of second electrodes are disposed in a same layer; a third electrode disposed on the second substrate, wherein an orthogonal projection of the third electrode on the first substrate is at least overlapped with an orthogonal projection of the second electrodes on the first substrate; and at least one controlling unit connected to the first electrodes, the second electrodes and the third electrode.

20 Claims, 12 Drawing Sheets

(56) References Cited

U.S. PATENT DOCUMENTS

| | | | | |
|---|---|---|---|---|
| 2016/0098109 A1* | 4/2016 | Choi | ................. | G06F 3/044 |
| | | | | 345/174 |
| 2016/0170543 A1* | 6/2016 | Kawamura | ......... | G06F 3/03547 |
| | | | | 345/174 |
| 2016/0313853 A1* | 10/2016 | Liou | ................. | G06F 3/044 |
| 2017/0115768 A1* | 4/2017 | Shih | ................. | G06F 3/044 |
| 2017/0192582 A1* | 7/2017 | Pan | ................. | G06F 3/0416 |

FOREIGN PATENT DOCUMENTS

| | | |
|---|---|---|
| CN | 103718143 A | 4/2014 |
| CN | 204557445 U | 8/2015 |
| CN | 105068695 A | 11/2015 |
| CN | 105117080 A | 12/2015 |
| CN | 105511683 A | 4/2016 |
| JP | 2006320484 A | 11/2006 |

* cited by examiner

TOUCH CONTROL DISPLAY PANEL, DRIVING METHOD AND TOUCH CONTROL DISPLAY DEVICE

CROSS-REFERENCES TO RELATED APPLICATIONS

This application claims priority of Chinese Patent Application No. 201610443116.1, filed on Jun. 20, 2016, the entire contents of which are hereby incorporated by reference.

FIELD OF THE INVENTION

The present disclosure generally relates to the field of display technology and, more particularly, relates to a touch control display panel, a driving method for the touch control display panel, and a touch control display device thereof.

BACKGROUND

With the continuous development of touch control display technologies, touchscreens are expected not only to detect a touch position, but also to detect a corresponding touch pressure, i.e., to realize a force touch. Current touch control display devices often comprise a plurality of driving electrodes and a plurality of sensing electrodes, in which, the driving electrodes and the sensing electrodes are alternately arranged and, accordingly, the detection of a touch position is realized via a change in capacitance between the driving electrode and sensing electrode. However, such touch control display devices may only detect a touch position, but may be unable to realize a force touch.

The disclosed touch control display panel, driving method and touch control display device thereof are directed to solve one or more problems set forth above and other problems.

BRIEF SUMMARY OF THE DISCLOSURE

One aspect of the present disclosure provides a touch control display panel. The touch control display panel comprises a first substrate, and a second substrate arranged opposite to the first substrate. The touch control display panel also comprises a plurality of first electrodes disposed on the first substrate and extending in a column direction and a row direction of the first substrate, and a plurality of second electrodes disposed in a gap between two first electrodes and electrically insulated from the first electrodes. The plurality of first electrodes and the plurality of second electrodes are disposed in a same layer; a third electrode disposed on the second substrate. An orthogonal projection of the third electrode on the first substrate is at least overlapped with an orthogonal projection of the second electrodes on the first substrate. At least one controlling unit connected to the first electrodes, the second electrodes and the third electrode.

Another aspect of the present disclosure provides a touch control display device comprising the touch control display panel.

Another aspect of the present disclosure provides a driving method for a touch control display panel. The touch control display panel comprises a first substrate, and a second substrate arranged opposite to the first substrate. The touch control display panel also comprises a plurality of first electrodes disposed on the first substrate and extending in a column direction and a row direction of the first substrate, and a plurality of second electrodes disposed in a gap between two first electrodes and electrically insulated from the first electrodes. The plurality of first electrodes and the plurality of second electrodes are disposed in a same layer; a third electrode disposed on the second substrate. An orthogonal projection of the third electrode on the first substrate is at least overlapped with an orthogonal projection of the second electrodes on the first substrate. At least one controlling unit connected to the first electrodes, the second electrodes and the third electrode. The method comprises: in a display stage, providing a common voltage signal to the first electrode and/or the second electrodes, and providing a constant reference signal to the third electrode or leaving the third electrode floated. The method also comprises: in a touch stage, providing a touch controlling driving signal to the first electrodes and the second electrodes, and a constant reference signal to the third electrode. According to the touch controlling driving signal, the first electrodes generate a touch sensing signal to realize a touch position detection. According to the touch controlling driving signal, the second electrodes generate a force touch sensing signal to realize a force touch.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined under conditions without conflicts.

Figure 1:
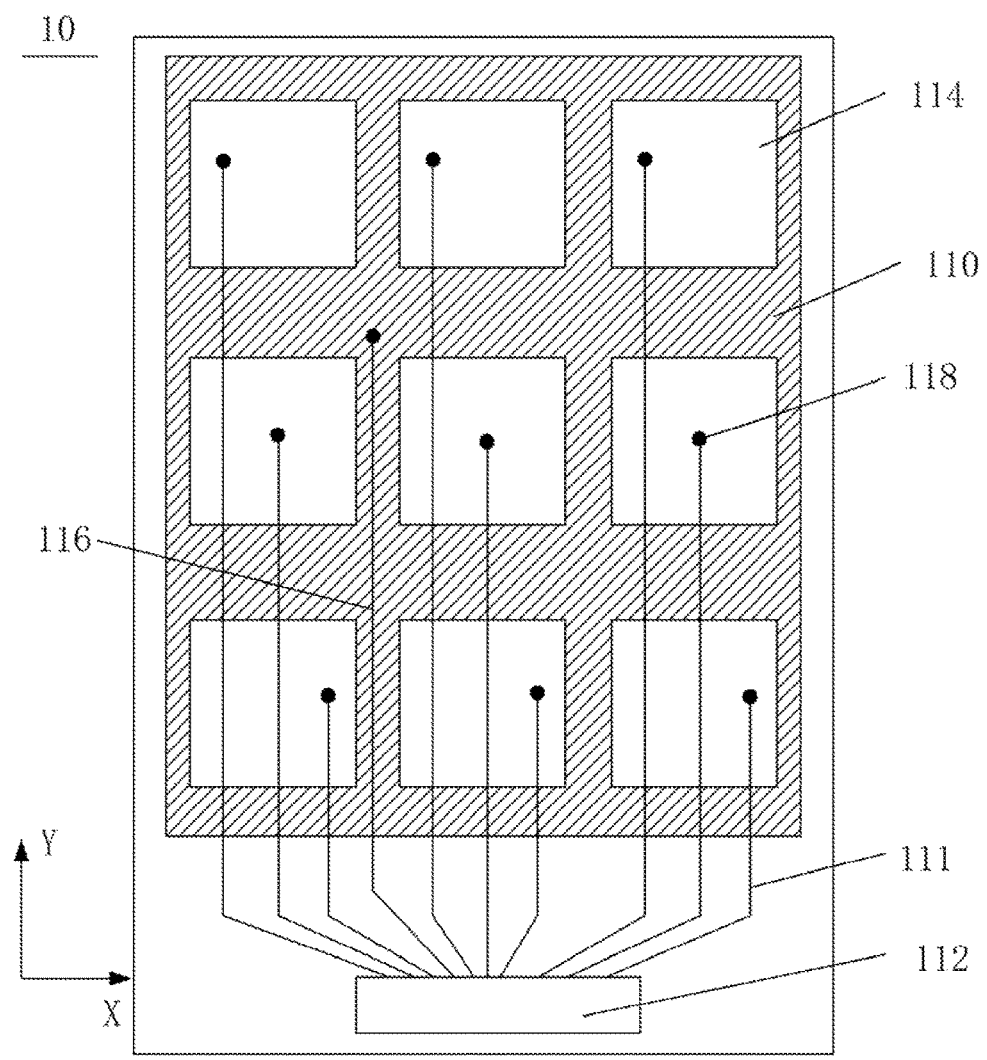
FIG. 1 illustrates a top view of a current touch control display panel.

Current touch control devices may realize the detection of a touch position, but may fail to realize a force touch, i.e., fail to detect a corresponding touch pressure. FIG. 1 illustrates a top view of a current touch control display panel. The touch control display panel 10 comprises a touch controlling electrode layer 110 including a plurality of touch controlling electrodes 114 extending in an X direction and a Y-direction. Each touch controlling electrode 114 functions as a self-capacitance touch controlling electrode and is connected to a controlling unit 112 through a touch wire 111, providing a touch driving signal and receiving a touch sensing signal through the controlling unit 112.

In practice, the controlling unit 112 applies the touch driving signal to the touch controlling electrodes 114, and an initial capacitance is formed. When an external touch is applied onto the touch control display panel, the touch controlling electrode 114 close to the touch position causes a change in the capacitance due to the capacitance of a touching object (e.g., a finger), and converts the capacitance change to a voltage signal, which is fed back to the control unit 112. Then, the controlling unit 112 analyzes the voltage signal through calculations, thereby determining a touch position of the finger. To suppress a signal interference between the touch controlling electrodes 114 and touch wires 111, the touch controlling electrodes 114 and touch wires 111 are disposed in different layers, and are electrically connected to each other by a plurality of through-holes 118.

In particular, the touch controlling electrode layer 110 is disposed on an array substrate having a plurality of thin-film-transistors (TFTs), or a color film substrate having a plurality of color filters, or another substrate different from the array substrate and the color film substrate. To realize a thinner and lighter touch control display panel, a common electrode is often multiplexed as the touch controlling electrode layer 110 in the current touch control display panel, through a time-division driving method. That is, in a display stage, a common voltage signal is provided to the touch controlling electrode layer 110, and in a touch stage, a touch driving signal is provided to the touch controlling electrode layer 110.

As shown in FIG. 1, the plurality of touch controlling electrodes 114 are arranged in an array. A certain gap is provided between adjacent touch controlling electrodes 114, and the width of the gap is approximately ¼ of the side of the touch controlling electrode 114. These gaps form a grid area (the shaded area in FIG. 1), which is connected to the touch controlling unit 112 through a plurality of wires 116. To improve a touch sensitivity when detecting an external touch, the controlling unit 112 applies the touch driving signal to the touch controlling electrodes 114 and, meanwhile, applies the common voltage signal or a ground signal to the grid area.

On the other hand, pixel capacitors are also formed between a pixel electrode layer and the common electrode layer. Because the common electrode layer is divided into the touch controlling electrodes 114 and the grid area (the shaded area in FIG. 1), the pixel capacitors formed between the pixel electrode layer and the common electrode layer also include two parts: pixel capacitors formed between the pixel electrode layer and the touch controlling electrodes 114, and pixel capacitors formed between the pixel electrode layer and the grid area.

In the touch stage, the touch driving signal is provided to the touch controlling electrodes 114, while the common voltage signal or a ground signal is provided to the grid area simultaneously, i.e. voltage signals provided to the touch controlling electrodes 114 and the grid area are different, leading to a voltage difference between two terminals of pixel capacitors and a visible grid pattern corresponding to the grid area. In addition, the current touch control display panel shown in FIG. 1 may only detect the touch position, but fail to detect a corresponding touch pressure applied by the external touch object. That is, the current touch control display panel may be unable to realize a force touch.

Force touch distinguishes force or touch pressure between taps and harder presses, and provides a specific action or contextually specific controls based on the force applied by the external touch object, which may bring new dimensions to user interfaces and interactive computing. Thus, touch control display panel implemented with force touch are highly desired. The present disclosure provides an improved touch control display panel capable of detecting a touch position and a touch pressure.

Figure 2A:
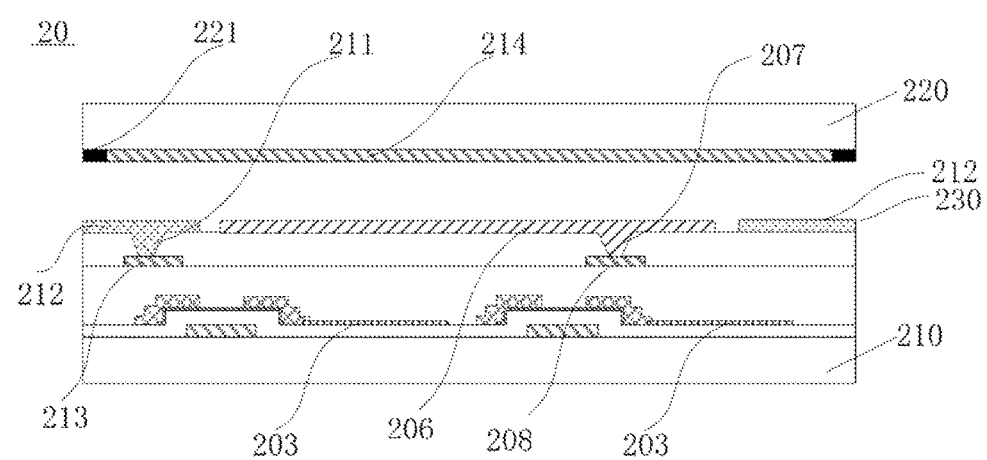
FIG. 2A illustrates a cross-sectional view of an exemplary touch control display panel consistent with disclosed embodiments.
Figure 2B:
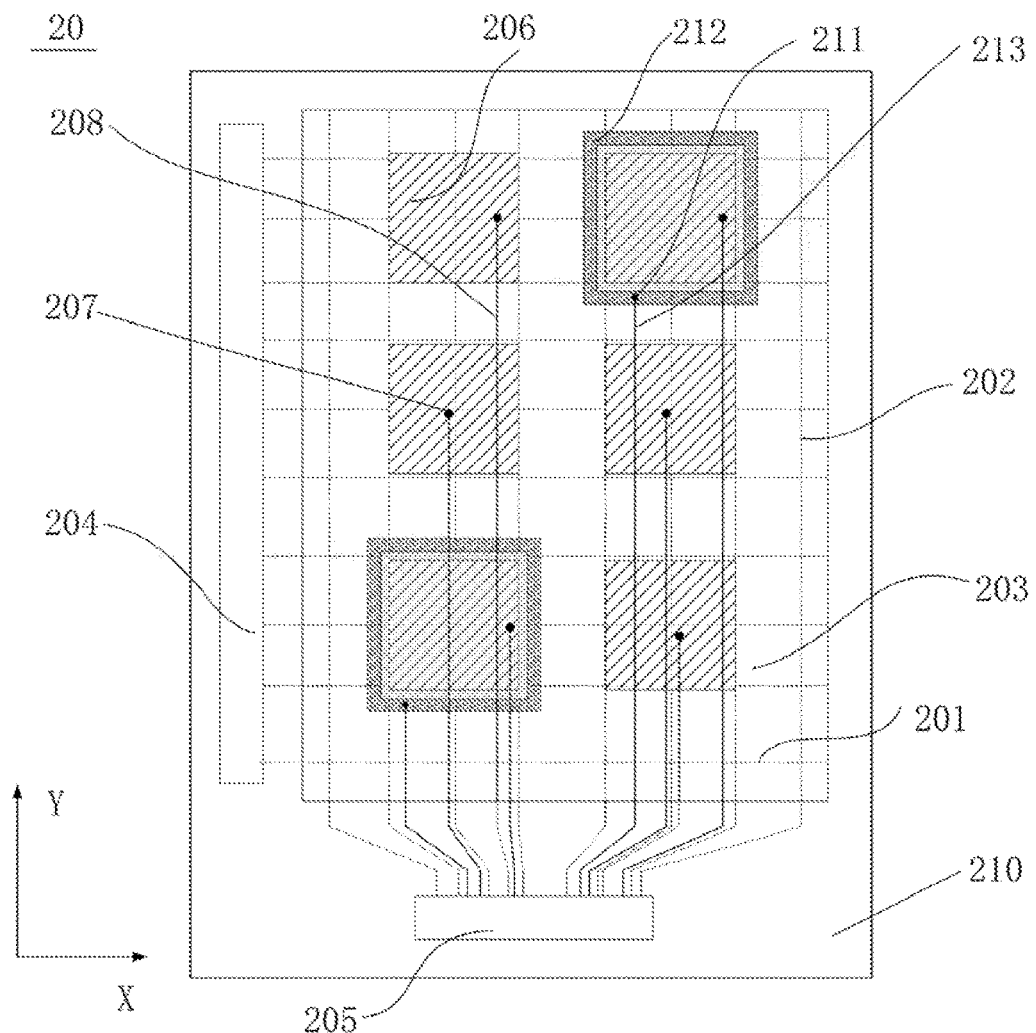
FIG. 2B illustrates a top view of an exemplary first substrate in an exemplary touch control display panel in FIG. 2A consistent with disclosed embodiments.
Figure 2C:
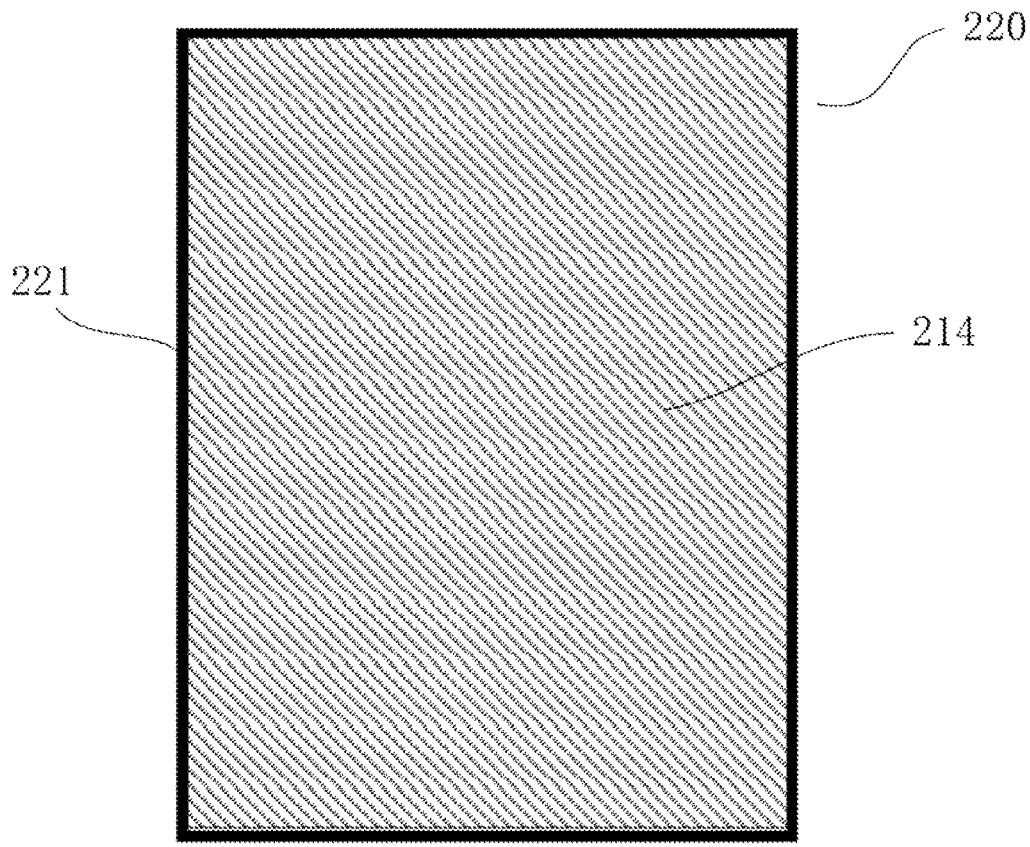
FIG. 2C illustrates a top view of an exemplary second substrate in an exemplary touch control display panel in FIG. 2A consistent with disclosed embodiments.

FIG. 2A illustrates a cross-sectional view of an exemplary touch control display panel consistent with disclosed embodiments. FIG. 2B illustrates a top view of an exemplary first substrate in an exemplary touch control display panel in FIG. 2A consistent with disclosed embodiments. FIG. 2C illustrates a top view of an exemplary second substrate in an exemplary touch control display panel in FIG. 2A consistent with disclosed embodiments.

As shown in FIGS. 2A-2C, the touch panel display 20 may include a first substrate 210 and a second substrate 220 disposed opposite to the first substrate 210. The first substrate 210 may include a plurality of scanning lines 201 extending in a row direction (e.g., X direction in FIG. 2B), a plurality of data lines 202 extending in a column direction (e.g., Y direction in FIG. 2B) and intersecting the scanning lines, and a plurality of pixel units 203 defined by the intersected data lines and scanning lines. The scanning lines 201 may be connected to a gate driving circuit 204, and may control a certain row of pixel units 203 (i.e., a certain pixel unit row) to be switched on according to a strobe signal generated by the gate driving circuit 204. The data lines 202 may be connected to a controlling unit 205, and may provide data signals of an image to be displayed to the pixel units 203 which has been switched on.

The pixel units 203 may be any appropriate pixel units capable of displaying videos and/or images, such as plasma display panel (PDP) pixel units, field emission display (FED) units, liquid crystal display (LCD) units, organic light-emitting diode (OLED) pixel units, light-emitting diode (LED) pixel units, quantum dots (QDs) pixel units, electrophoretic pixel units (i.e., e-readers) or other types of pixel units.

As shown in FIGS. 2A-2B, the first substrate 210 may further include a touch controlling electrode layer 230, which may include a plurality of first electrodes 206 extending in the row direction (e.g., X direction in FIG. 2B) and the column direction (e.g., Y direction in FIG. 2B). One first electrode 206 may correspond to at least two pixel units 203. Further, each first electrode 206 may be individually connected to a first wire 208, and further electrically connected to the controlling unit 205 through the corresponding first wire 208.

In one embodiment, as shown in FIG. 2B, the plurality of first electrodes 206 may arranged in an array and electrically insulated from each other, and the first electrode 206 may be a pad electrode in a rectangular shape. One first electrode 206 may correspond to four pixel units 203, which is for illustrative purposes and is not intended to limit the scope of the present disclosure.

The first electrode 206 may be a self-capacitance electrode (i.e., a self-capacitance sensor) for detecting a touch position. During a detection of the external touch, the controlling unit 205 may apply a touch driving voltage to the first electrodes 206. When there is an external touch applied onto the touch control display panel, for example, a finger presses, the capacitance of the first electrode 206 close to the touch position (e.g., the finger) may be changed, while the capacitance of the first electrode 206 far away from the touch position (e.g., the finger) may remain substantially the same. Thus, the touch position may be determined by the controlling unit 205 through analyzing the capacitance change of the first electrodes 206.

In addition to detect a touch position, the touch panel display 20 may also be able to detect a corresponding touch pressure or a touch force, i.e., realize a force touch. As shown in FIGS. 2B-2C, the first substrate 210 may further include a plurality of second electrodes 212 and a plurality of second wires 213, while the second substrate 220 may further include a third electrode 214 and a conductive frame adhesive 221. The conductive frame adhesive 221 may be disposed between an inner surface of the first substrate 210 and an inner surface of the second substrate 220, sealing a cell formed by the first substrate 210 and the second substrate 220 and, meanwhile, preventing external moisture and oxygen from entering the cell.

The second electrodes 212 and the third electrode 214 may function as pressure sensing electrodes, i.e., force sensors. In particular, the second electrodes 212 may be disposed in the same layer as the first electrodes 206. The second electrode 212 may be disposed in a gap between first electrodes 206. The second electrode 212 may be disposed surrounding the first electrode 206 to form a closed area, but electrically insulated from the first electrode 206. At least one first electrode 206 may be surrounded by one second electrode 212. In one embodiment, as shown in FIG. 2A, two first electrodes 206 each may be surrounded by one second electrode 212.

The third electrode 214 may be disposed on the inner surface of the second substrate 220, i.e., the surface of the second substrate 220 facing the first substrate 210. The third electrode 214 may be entirely disposed on the inner surface of the second substrate 220. For example, the third electrode 214 may be a planar indium tin oxide (ITO) electrode. An orthogonal projection of the third electrode 214 on the first substrate 210 may be at least overlapped with an orthogonal projection of the second electrodes 212 on the first substrate 210, such that a capacitor may be formed in an overlapped area of the third electrode 214 and the second electrodes 212.

Further, each second electrode 212 may be individually connected to a second wire 213, and further electrically connected to the controlling unit 205 through the corresponding second wire 213. The third electrode 214 may be electrically connected to the controlling unit 205 through the conductive frame adhesive 221 disposed between the first substrate 210 and second substrate 220. The number and shape of the first electrodes 206 and the second electrodes 212 shown in FIGS. 2A-2B are for illustrative purposes and are not intended to limit the scope of the present disclosure.

Figure 3:
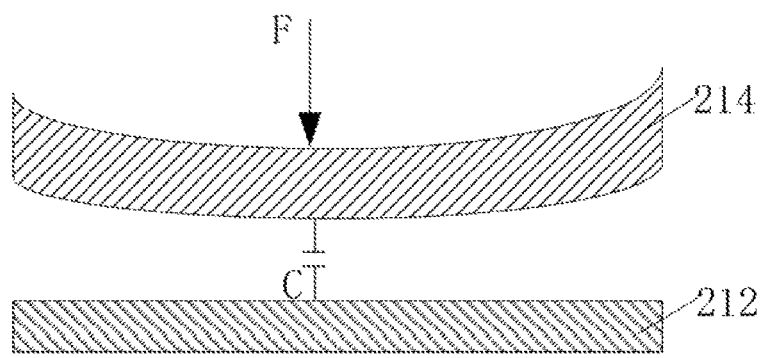
FIG. 3 illustrates a principle of capacitive force touch in an exemplary touch control display panel in FIG. 2A consistent with disclosed embodiments.

FIG. 3 illustrates a principle of capacitive force touch consistent in an exemplary touch control display panel in FIG. 2A with disclosed embodiments. As shown in FIG. 3 and FIG. 2A, the second electrode 212, the third electrode 214, and a compressible media (not drawn in FIG. 3) may form a capacitor C. The compressible media may refer to a media which can be elastically deformed under an external pressure, such as liquid crystals (LCs) and air. Once the second electrode 212 and the third electrode 214 are determined, an overlapped area S of the second electrode 212 and the third electrode 214 may be fixed. Meanwhile, materials of the compressible media may also be fixed once the touch panel display 20 is formed. According to equation $C=kS/d$, when the materials of the compressible media and the overlapped area are fixed, i.e., permittivity k and overlapped area S are fixed, the capacitance C is inversely proportional to a separation or a distance d between the second electrode 212 and the third electrode 214.

When an external force F results an elastic deformation of the compressible media, the distance d between the second electrode 212 and the third electrode 214 may be changed, and the capacitance C may be changed accordingly. The external force F in different magnitudes may lead to different elastic deformation of the compressible media, thus, the distance d between the second electrode 212 and the third electrode 214 may be changed differently, and the capacitance C may be varied accordingly. That is, external force F of different magnitudes may result different capacitance C. Thus, through detecting the corresponding capacitance C, a magnitude of the external force F may be identified.

Returning to FIGS. 2A-2B, when the touch control display panel 20 undergoes a force touch, the controlling unit 205 may apply a force touch driving voltage to the second electrode 212 and a constant reference voltage to the third electrode 214. When the external force F applied onto a touch position of the touch control display panel 20 varies, the distance between the second electrode 212 and the third electrode 214 at the touch position may be changed which, in turn, change the capacitance C between the second electrode 212 and the third electrode 214. Thus, through analyzing a change in the capacitance C, the controlling unit 205 may be able to determine the magnitude of the external force F.

To suppress a signal interference between the signal lines and the electrodes, the first electrodes 206 and the second electrodes 212 may be disposed in a layer different from the first wires 208 and the second wires 213. Each first electrode 206 may be electrically connected to the corresponding first wire 208 through a first through-hole 207, and each second electrode 212 may be electrically connected to the corresponding second wire 213 through a second through-hole 211. In one embodiment, the first wires 208 and the second wires 213 may be disposed in a same layer, such that the number of the layers for disposing wires may be reduced, and the touch control display panel may be thinner and lighter. In another embodiment, the first wires 208 and the second wires 213 may be disposed in different layers.

In the disclosed embodiments, the first wires 208 and the second wires 213 may be fabricated with the same transparent conductive material as the first electrodes 206, such as indium tin oxide (ITO). In certain embodiments, the first wires 208 and the second wires 213 may be fabricated with high conductivity opaque metals, such as copper, and the first wires 208 and the second wires 213 may be disposed under a black matrix. For example, referring to FIG. 10, the first wires 208 and the second wires 213 may be disposed under the black matrix 240. That is, an orthogonal projection of the black matrix 240 onto the first substrate 210 may cover the orthogonal projection of the first wires 208 and the second wires 213 onto the first substrate 210. Thus, light transmittance of the touch control display panel may not be reduced by the first wires 208 and the second wires 213 fabricated with high conductivity opaque metals.

On the other hand, to suppress an interference between the position touch signal and force touch signal, a certain gap may be formed between the first electrode and the second electrode, such that a desired electrical insulation may be realized between the first electrode 206 and the second electrode 212.

In the disclosed embodiments, the touch controlling electrode layer 230 may also function as a common electrode layer, and the first electrodes 206 and/or the second electrodes 212 may be multiplexed as common electrodes for displaying images. Through applying a common voltage $V_{com}$ to the common electrode 206, a driving voltage may be formed between the common voltage $V_{com}$ and a data voltage at the corresponding pixel unit 203, which may drive display medium (e.g., liquid crystals) in the touch control display panel 20 to display images. Thus, the disclosed touch control display panel may simultaneously achieve three functions, i.e., display, touch position detection and force touch, without increasing the number of the film layers in the current display panel.

Figure 4:
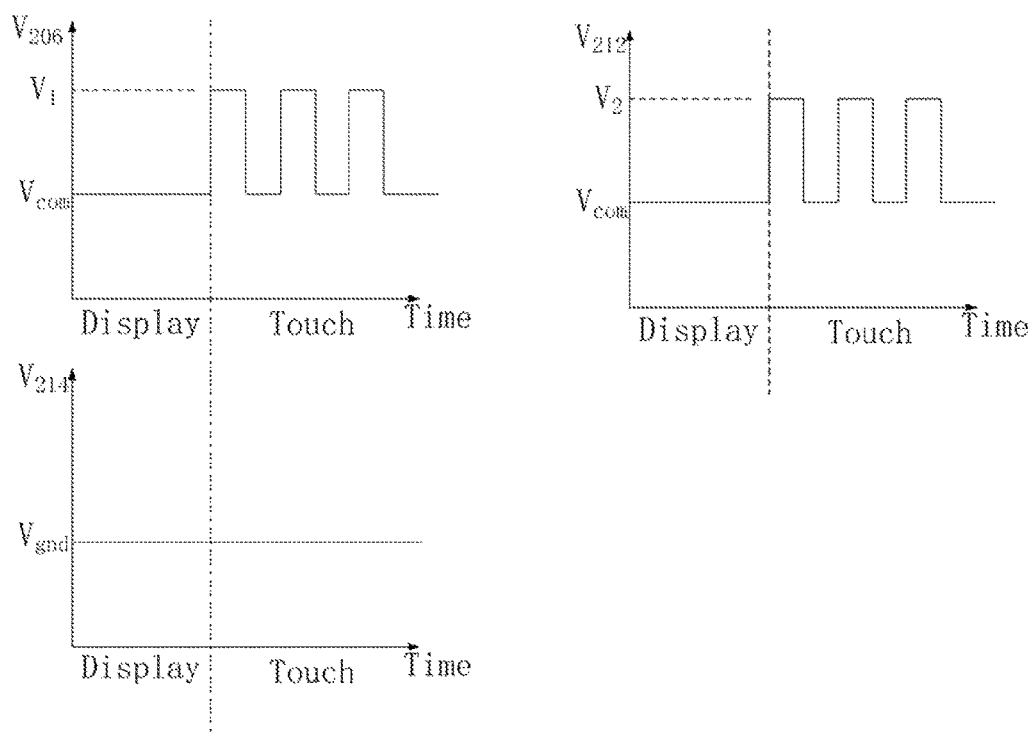
FIG. 4 illustrates an exemplary time-division driving method consistent with disclosed embodiments.

The present disclosure further provides a driving method for any disposed touch control display panel. FIG. 4 illustrates an exemplary time-division driving method consistent with disclosed embodiments.

As shown in FIG. 4, the horizontal axis denotes time which includes a display stage and a touch stage, and the vertical axis denotes voltage signals applied to various electrodes by a controlling unit. Referring to FIG. 2A and FIG. 4, $V_{206}$, $V_{212}$, $V_{214}$ respectively denote the voltage signals applied to the first electrodes 206, the second electrodes 212, and the third electrode 214 by the controlling unit 205.

In particular, in the display stage, the controlling unit 205 may provide a common voltage $V_{com}$ to the first electrodes 206 and the second electrodes 212, and provide a first constant reference signal $V_{constant1}$ to the third electrode 214. In the touch stage, the controlling unit 205 may provide a touch driving signal $V_1$ to the first electrodes 206, a force touch driving signal $V_2$ to the second electrodes 212, and provide a second constant reference signal $V_{constant2}$ to the third electrode 214. The force touch driving signal $V_2$ and the touch driving signal $V_1$, may be referred as a touch controlling driving signal.

In one embodiment, the second constant reference signal $V_{constant2}$ may be the same as the first constant reference signal $V_{constant1}$. For example, the second constant reference signal $V_{constant2}$ and the first constant reference signal $V_{constant1}$ may be a ground signal $V_{gnd}$, respectively. In another embodiment, the second constant reference signal $V_{constant2}$ may be different the first constant reference signal $V_{constant1}$. For example, the first constant reference signal $V_{constant1}$ may be the ground signal $V_{gnd}$ and the second constant reference signal $V_{constant2}$ may be the common voltage $V_{com}$.

According to the touch driving signal $V_1$, the first electrodes 206 may generate and transmit a touch sensing signal to the controlling unit 205, which may determine the touch position through analysis and calculation. Meanwhile, according to the force touch driving signal $V_2$, the second electrodes 212 may generate and transmit a force touch sensing signal to the controlling unit 205, which may determine the magnitude of the force touch through analysis and calculation.

As discussed above, in the touch stage, the controlling unit may simultaneously provide the touch driving signal to the first electrodes and the force touch driving signal to the second electrodes. The touch driving signal and the force touch driving signal may have similar or same voltages. Thus, a voltage difference between the two terminals of the pixel capacitor may be suppressed, and the grid pattern among the touch controlling electrodes caused by the non-uniform electric field distribution within the display medium (e.g., liquid crystals) may become invisible accordingly.

In the disclosed touch control display panel, through multiplexing the common electrode layer as the touch controlling electrode layer, three functions, i.e., display, touch position detection and force touch, may be realized simultaneously. That is, the disclosed touch control display panel may be integrated with three functions, i.e., display, touch position detection and force touch. The force touch may bring new dimensions to user interfaces and interactive computing. Moreover, in the touch stage, a time-division driving may not be required for realizing the touch position detection and force touch, which may be highly desired for high resolution and high frequency displays. The visibility of the grid pattern among the touch controlling electrodes may be suppressed, and the image performance of the disclosed touch control display panel may be improved accordingly.

Figure 5:
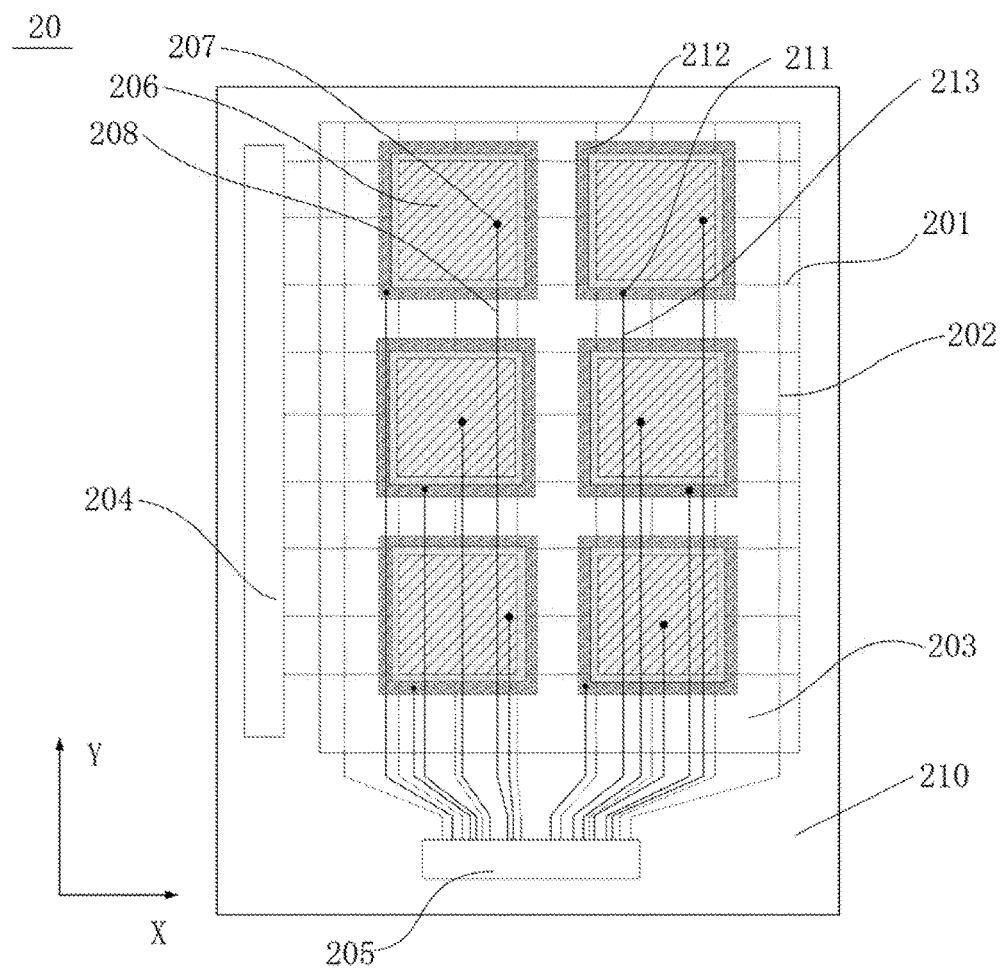
FIG. 5 illustrates a top view of another exemplary touch control display panel consistent with disclosed embodiments.

FIG. 5 illustrates a top view of another exemplary touch control display panel consistent with disclosed embodiments. The similarities between FIG. 5 and FIG. 2B are not repeated here, while certain differences may be explained. As shown in FIG. 5, the second electrodes 212 may be disposed in the gaps between any two adjacent first electrodes 206. For example, as shown in FIG. 5, each first electrode 206 may be surrounded by one second electrode 212 but electrically insulated from the corresponding second electrode 212. That is, the first electrodes 206 (i.e., touch controlling electrodes) may be one-to-one corresponding to the second electrodes 212 (i.e., pressure sensing electrodes).

Because the force touch signal is often much smaller than the touch sensing signal, when the first electrodes 206 (i.e., touch controlling electrodes) is one-to-one corresponding to the second electrodes 212 (i.e., pressure sensing electrodes), the force touch signal may not be covered by the touch sensing signal, i.e., the force touch signal may be distinguished from the touch sensing signal. Thus, the touch control display panel 20 may have an improved sensitivity of the force touch.

Figure 6:
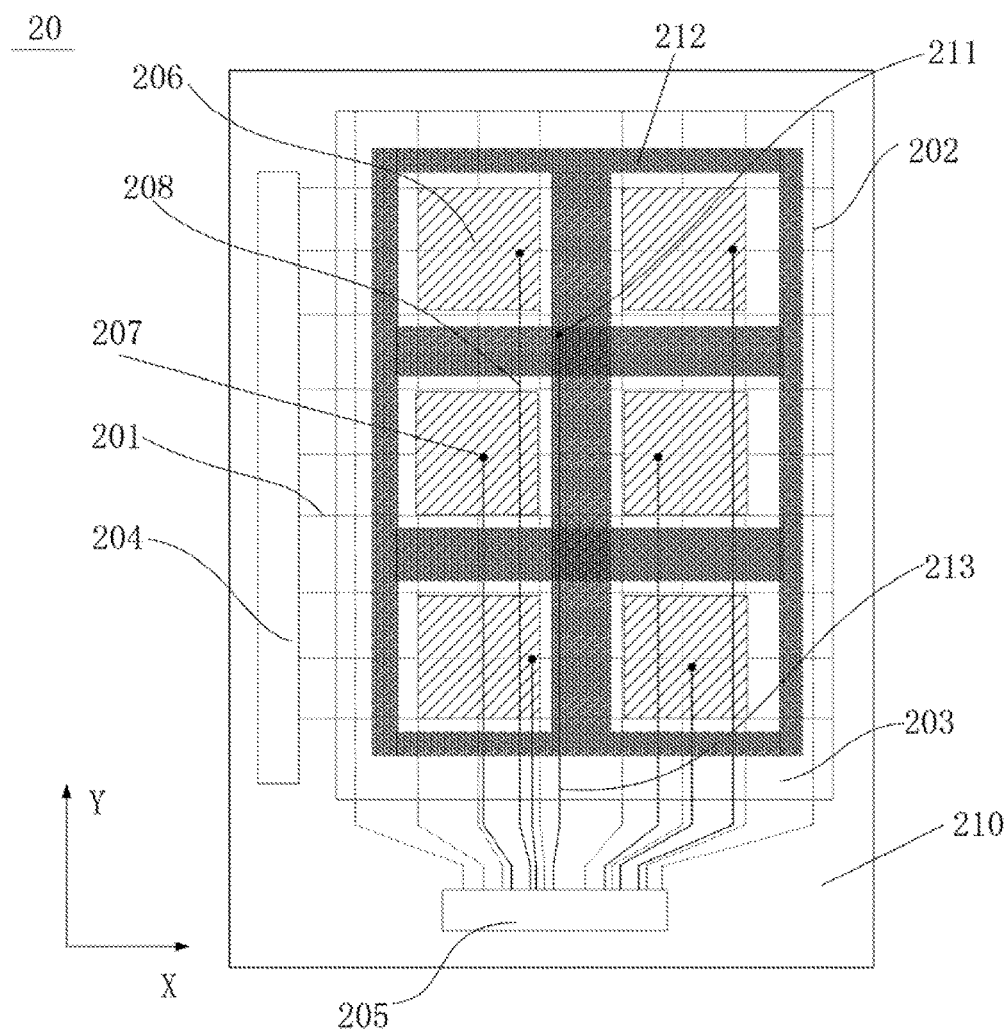
FIG. 6 illustrates a top view of another exemplary touch control display panel consistent with disclosed embodiments.

FIG. 6 illustrates a top view of another exemplary touch control display panel consistent with disclosed embodiments. The similarities between FIG. 5 and FIG. 6 are not repeated here, while certain differences may be explained. As shown in FIG. 6, the second electrodes 212 may be disposed in the gaps between any two adjacent first electrodes 206. For example, as shown in FIG. 6, each first electrode 206 may be surrounded by one second electrode 212, i.e., the first electrodes 206 (i.e., touch controlling electrodes) may be one-to-one corresponding to the second electrodes 212 (i.e., pressure sensing electrodes). Further, the adjacent second electrodes 212 may be connected to each other, forming a grid second electrode which is electrically connected to the second wire 213.

Compared to the touch control display panel in FIG. 5, the touch control display panel in FIG. 6 may fully utilize the gaps between the first electrodes 206 to dispose the second electrodes 212, which may increase the effective area of the second electrodes 212 disposed above the touch controlling electrode layer 230. Meanwhile, through forming the grid second electrode, the sheet resistance of the gird second electrode 212 may be reduced, the force touch signal may be enhanced, and the sensitivity of the force touch may be improved accordingly.

Figure 7:
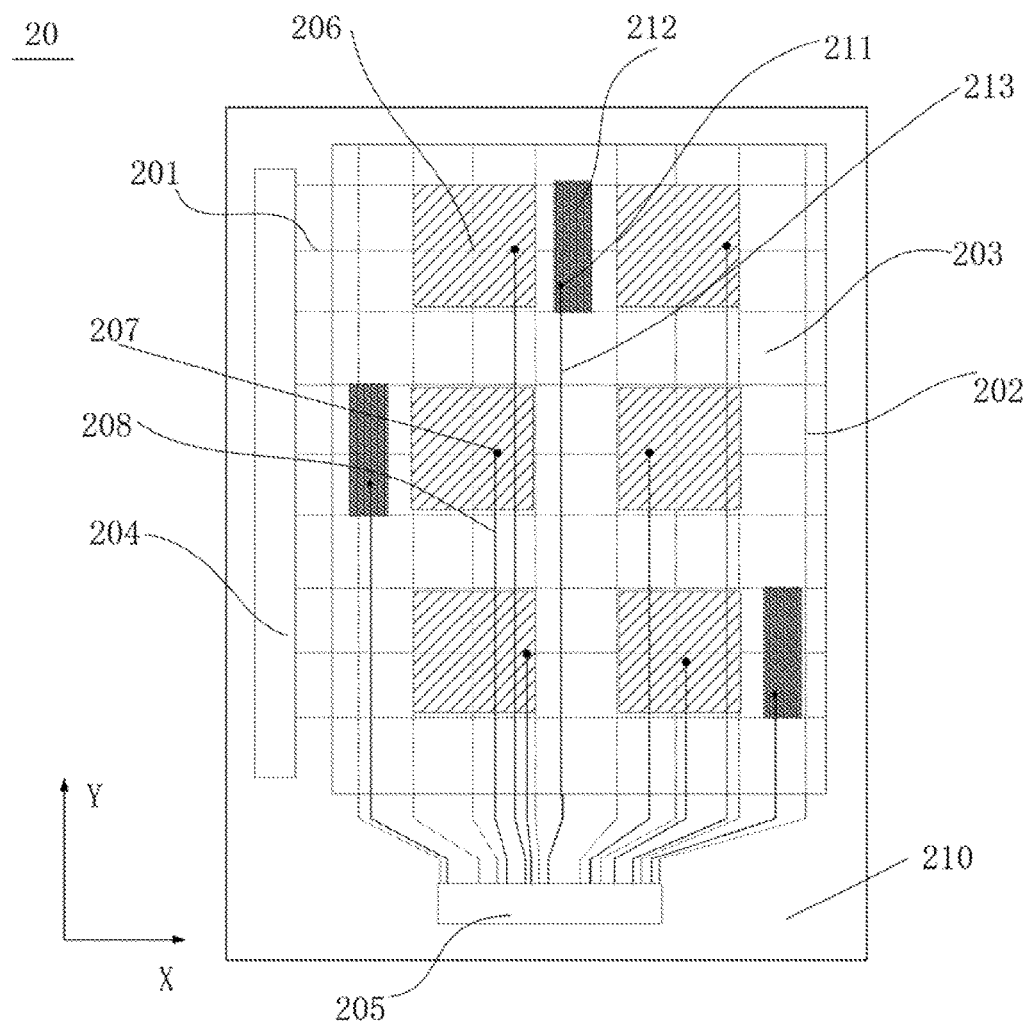
FIG. 7 illustrates a top view of another exemplary touch control display panel consistent with disclosed embodiments.

FIG. 7 illustrates a top view of another exemplary touch control display panel consistent with disclosed embodiments. The similarities between FIG. 7 and FIG. 2B are not repeated here, while certain differences may be explained. As shown in FIG. 7, at least one second electrodes 212 may be disposed in an adjacent region between two first electrodes 206 while not surrounding the first electrode 206, and each second electrode 212 may be connected to a second wire 213. In one embodiment, as shown in FIG. 7, at least one second electrodes 212 may be disposed in an adjacent region between two first electrodes 206 adjacent in the row direction. In another embodiment, at least one second electrodes 212 may be disposed in an adjacent region between two first electrodes 206 adjacent in the column direction.

Compared to the touch control display panel in FIG. 2B, the touch control display panel in FIG. 7 may have a simpler fabrication process. That is, to fabricate the second electrodes 212 in FIG. 2B, a photomask shown in FIG. 8A may be required, while to fabricate the second electrodes 212 in FIG. 7, a photomask shown in FIG. 8B may be required.

Figure 8A:
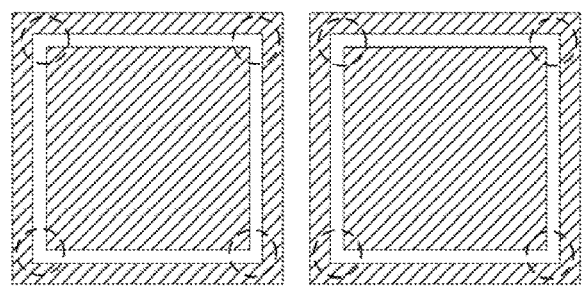
FIG. 8A illustrates a top view of an exemplary photomask consistent with disclosed embodiments.
Figure 8B:
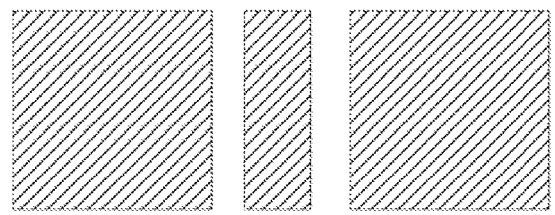
FIG. 8B illustrates a top view of another exemplary photomask consistent with disclosed embodiments.

As shown in FIGS. 8A-8B, the photomask in FIG. 8A may require a more complicated mold for the photomask than the photomask in FIG. 8B. In addition, due to the stress around the corners (shown in the circled area in FIG. 8A) during the molding process, the photomask in FIG. 8A may require advanced molding techniques. Compared to the photomask in FIG. 8A, the photomask in FIG. 8B may be much easier to be fabricated and, thus, the structure of the first electrodes and the second electrodes may be made more accurate in the fabrication process.

Figure 9:
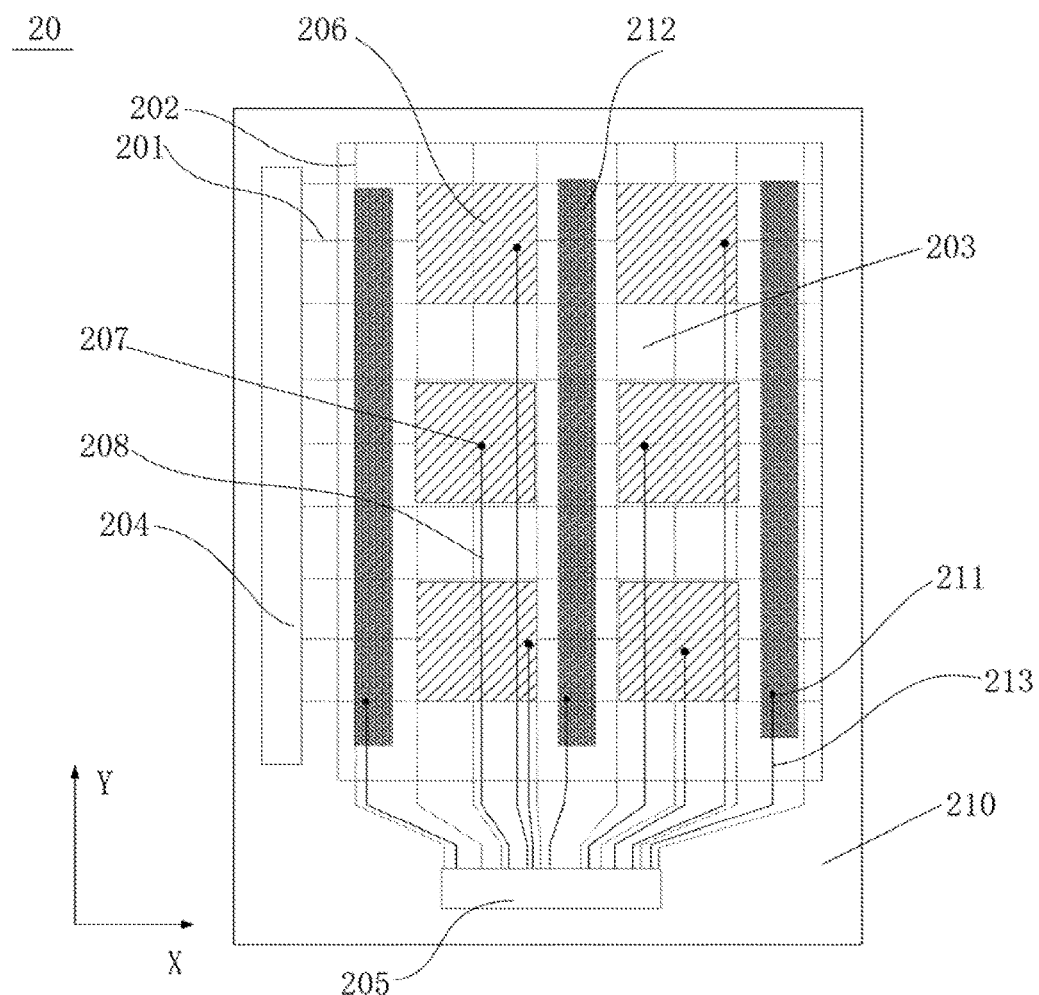
FIG. 9 illustrates a top view of another exemplary touch control display panel consistent with disclosed embodiments.

FIG. 9 illustrates a top view of another exemplary touch control display panel consistent with disclosed embodiments. The similarities between FIG. 7 and FIG. 9 are not repeated here, while certain differences may be explained. As shown in FIG. 9, the second electrodes 212 may be disposed in an adjacent region between any two adjacent first electrodes 206 while not surrounding the first electrode 206. The second electrodes 212 may be one-to-one corresponding to the first electrodes 206. Adjacent second electrodes 212 may be connected to form a stripe-shaped second electrode 212, and each stripe-shaped second electrode 212 may be connected to a second wire 213.

In one embodiment, as shown in FIG. 9, the second electrodes 212 may be disposed in an adjacent region between two columns of the first electrodes 206, and each stripe-shaped second electrode 212 may extend in a column direction (e.g., Y direction in FIG. 9). In another embodiment, the second electrodes 212 may be disposed in an adjacent region between two rows of the first electrodes 206, and each stripe-shaped second electrode 212 may extend in a row direction (e.g., X direction in FIG. 9).

Compared to the touch control display panel in FIG. 7, in the touch control display panel in FIG. 9, the covering area of the pressure sensing electrode on the touch controlling electrode layer 230 may be increased, while the sheet resistance of the second electrodes 212 and the length of the second wires 213 may be reduced. Thus, a signal difference between the two terminals of the stripe-shaped second electrode 212, which is caused by the resistance of the second wires 213, may be suppressed, and the sensitivity of the force touch may be improved accordingly.

Figure 10:
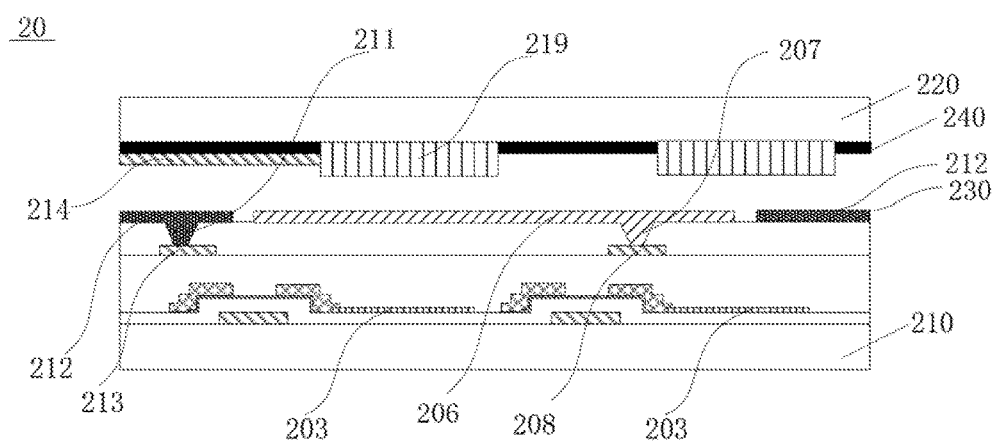
FIG. 10 illustrates a cross-sectional view of another exemplary touch control display panel consistent with disclosed embodiments.

FIG. 10 illustrates a top view of another exemplary touch control display panel consistent with disclosed embodiments. The similarities between FIG. 10 and FIG. 2A are not repeated here, while certain differences may be explained.

As shown in FIG. 10, the second substrate 220 may further include a black matrix 240 and a plurality of color barriers 219 corresponding to the sub-pixels disposed on the first substrate 210. The plurality of color barriers 219 may have different colors. Further, the third electrode 214 may include a plurality of sub electrodes 214, which may be disposed on a surface of the black matrix 240 facing the first substrate 210. In particular, the orthogonal projection of the black matrix 240 onto the second substrate 220 may cover the orthogonal projection of the third electrodes 214 onto the second substrate 220.

Figure 11:
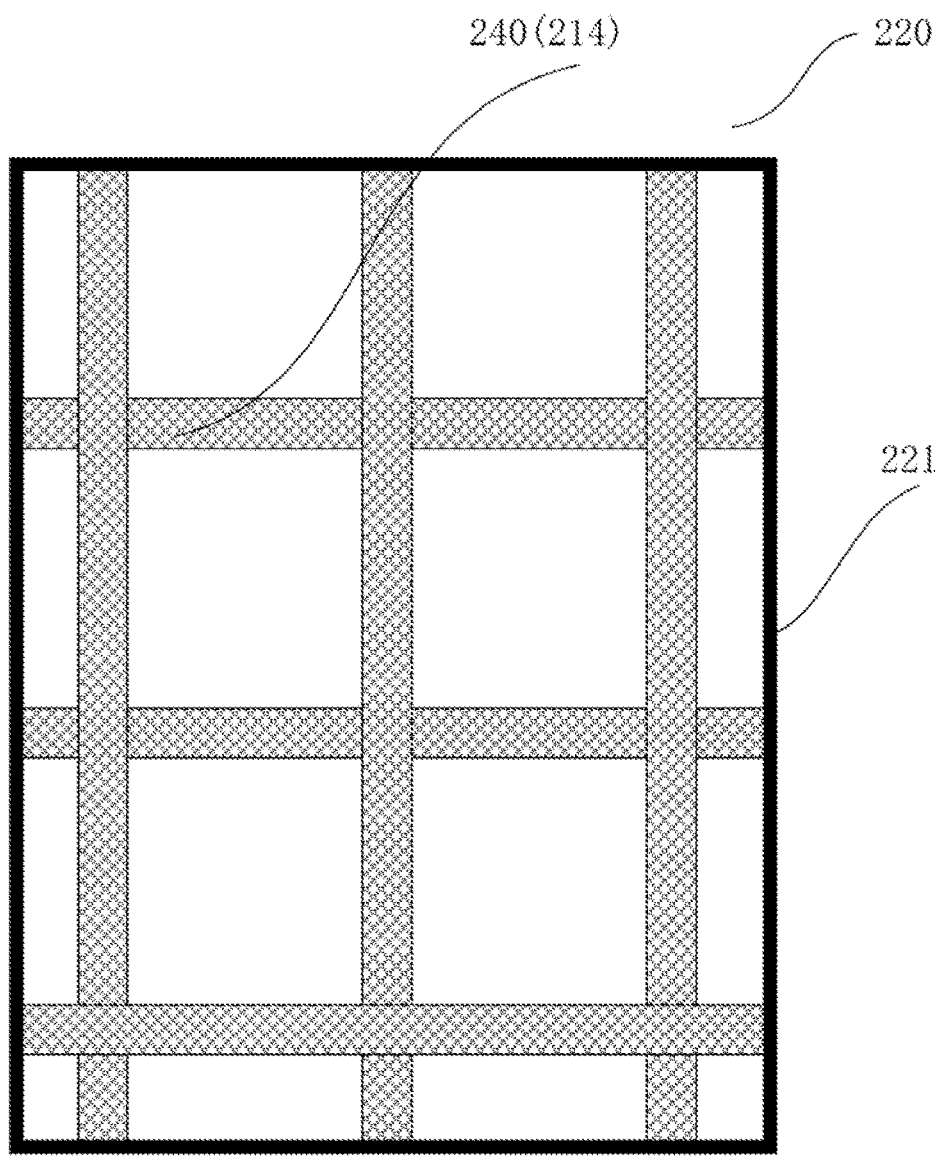
FIG. 11 illustrates a top view of an exemplary second substrate in an exemplary touch control display panel in FIG. 10 consistent with disclosed embodiments.

FIG. 11 illustrates a top view of an exemplary second substrate in an exemplary touch control display panel in FIG. 10 consistent with disclosed embodiments. As shown in FIG. 11, the third electrode 214 may be a non-planar electrode, and the black matrix 240 may include a plurality of black matrix stripes. In particular, the orthogonal projection of the black matrix 240 onto the second substrate 220 may cover the orthogonal projection of the third electrode 214 onto the second substrate 220. Further, referring to FIG. 10 and FIG. 11, the third electrode 214 may be electrically connected to the controlling unit 205 on the first substrate 210 through the conductive frame adhesive 221.

In one embodiment, the third electrode 214 may be made of transparent ITO materials, for example, as shown in FIG. 11, the third electrode 214 may be an ITO mesh electrode. In another embodiment, the third electrode 214 may be made of high conductivity metal materials. For example, as shown in FIG. 11, the third electrode 214 may be a metal mesh electrode having a micron-scale pore structure. Because metal mesh may exhibit a much higher conductivity than transparent ITO materials, the third electrode 214 made of metal mesh may significantly improve the sensitivity of the force touch. The shape of the pores in the metal mesh electrode in FIG. 11 is for illustrative purposes and is not intended to limit the scope of the present disclosure.

In one embodiment, the third electrode 214 may be disposed on a surface of the black matrix 240 far away from the first substrate 210. In particular, the orthogonal projection of the black matrix 240 onto the second substrate 220 may cover the orthogonal projection of the third electrodes 214 onto the second substrate 220. In another embodiment, the black matrix 240 or the color barriers 219 may be disposed on the first substrate 210. Accordingly, the first substrate 210 may be a black matrix on array substrate (BOA) or a color filter on array substrate (COA).

The disclosed touch control display panel may achieve three functions, i.e., display, touch position detection and force touch, without increasing the number of the film layers in the current display panel. In one embodiment, the third electrode disposed on the second substrate may be electrically connected to the controlling unit disposed on the first substrate through the conductive frame adhesive. In another embodiment, at least one wire may be disposed on the second substrate, through which the third electrode disposed on the second substrate may be electrically connected to the controlling unit disposed on the first substrate.

In one embodiment, the common electrode layer may be multiplexed as the touch controlling electrodes. In another embodiment, the touch controlling electrode layer may be an individual layer different from the common electrode layer. In one embodiment, the controlling unit for display, touch position detection, and force touch may be integrated as one controlling unit in the touch control display panel. In another embodiment, each of the display, touch position detection, and force touch may be controlled by an individual controlling unit.

Further, the disclosed time-division driving method may be applicable to any disclosed touch control display panel. In the touch stage, the controlling unit may simultaneously provide the touch driving signal to the first electrodes and the force touch driving signal to the second electrodes. The touch driving signal and the force touch driving signal may have similar or same voltages, and, thus, a voltage difference between the two terminals of the pixel capacitor may be suppressed. The visibility of the grid pattern among the touch controlling electrodes may be suppressed, and the image performance of the disclosed touch display panel may be improved accordingly. Moreover, in the touch stage, the time-division driving may not be required for realizing the touch position detection and force touch, which may be highly desired for high resolution and high frequency displays.

Figure 12:
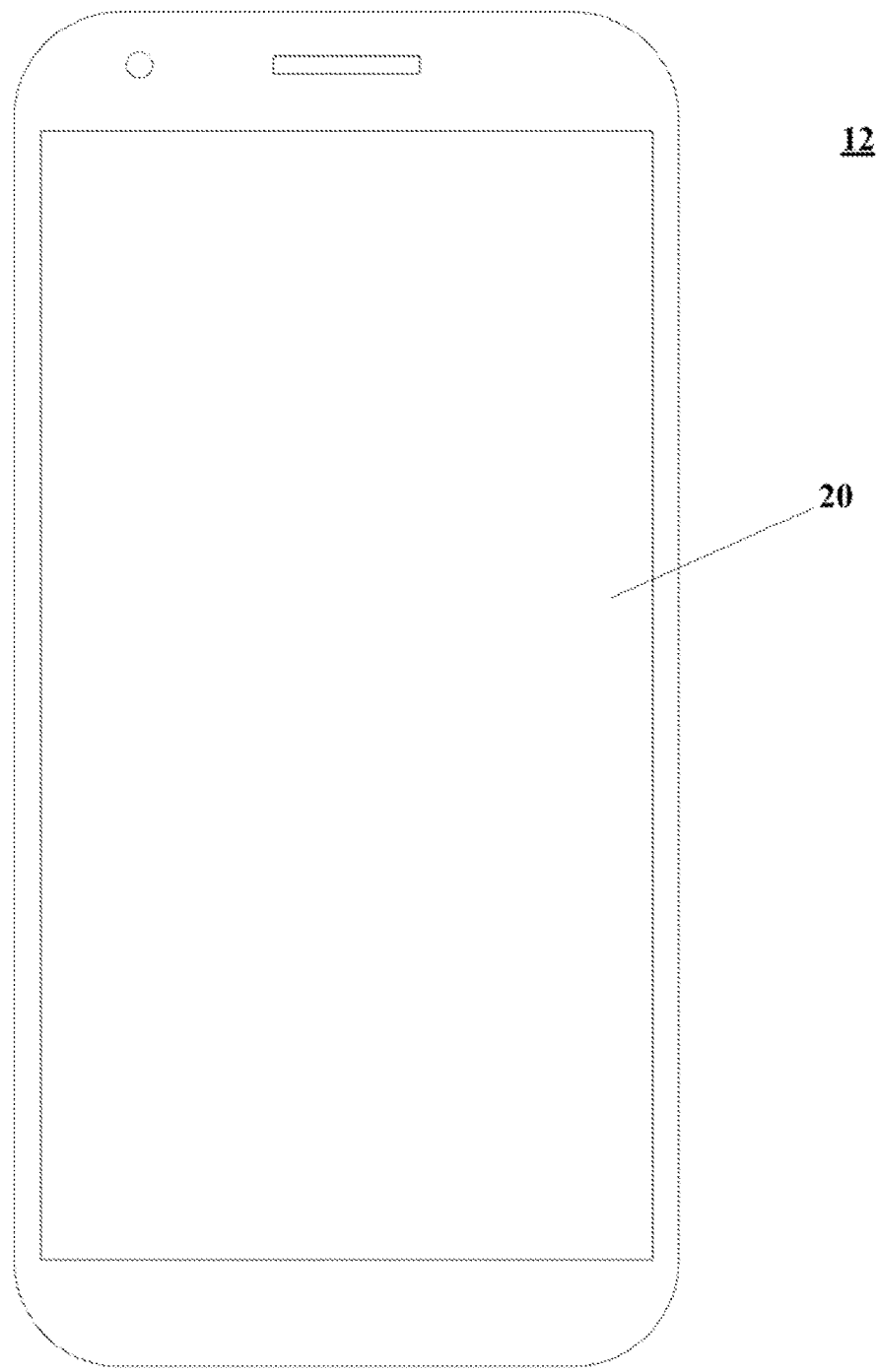
FIG. 12 illustrates an exemplary touch control display device consistent with disclosed embodiments.

The present disclosure further provides a touch control display device. FIG. 12 illustrates an exemplary touch control display device consistent with disclosed embodiments. As shown in FIG. 12, the touch control display device 12 may include a touch control display panel 20, which may be any of the disclosed touch control display panels. The disclosed touch control display device 12 may be a smart wearable device, a tablet, a TV, a smartphone, a notebook, and, a digital frame, etc. Further, the touch control display device 12 may be any appropriate type of content-presentation devices.

Because the disclosed touch control display device 12 includes any of the disclosed touch control display panels, the disclosed touch control display device 12 may also exhibit the same advantages as the disclosed touch control display panels. That is, the disclosed touch control display device may simultaneously achieve three functions, i.e., display, touch position detection and force touch, without increasing the number of the film layers in the current display panel. On the other hand, visibility of the grid pattern among the touch controlling electrodes may be suppressed, and the image performance of the disclosed touch control display panel may be improved accordingly.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A touch control display panel, comprising:
   a first substrate;
   a second substrate arranged opposite to the first substrate;
   a plurality of first electrodes disposed on the first substrate and extending in a column direction and a row direction of the first substrate,
   a plurality of second electrodes disposed in a gap between two first electrodes and electrically insulated from the first electrodes, wherein the plurality of first electrodes and the plurality of second electrodes are disposed in a same layer;
   a third electrode disposed on the second substrate, wherein an orthogonal projection of the third electrode on the first substrate is at least overlapped with an orthogonal projection of the second electrodes on the first substrate;
   at least one controlling unit connected to the first electrodes, the second electrodes and the third electrode; and
   a conductive frame adhesive connected to the third electrode and the at least one controlling unit.

2. The touch control display panel according to claim 1, wherein:
   at least one second electrode is disposed surrounding a first electrode.

3. The touch control display panel according to claim 1, wherein:
   the plurality of second electrodes are one-to-one corresponding to the plurality of first electrodes; and
   a second electrode is disposed surrounding the corresponding first electrode.

4. The touch control display panel according to claim 3, wherein:
   at least two adjacent second electrodes are connected to form a grid second electrode.

5. The touch control display panel according to claim 1, wherein:
   at least one second electrode is disposed in an adjacent region between two first electrodes adjacent in the column direction or adjacent in the row direction.

6. The touch control display panel according to claim 1, wherein:
   the plurality of second electrodes are one-to-one corresponding to the plurality of first electrodes; and
   a second electrode is disposed in an adjacent region between two first electrodes adjacent in the column direction or adjacent in the row direction.

7. The touch control display panel according to claim 6, wherein:
   at least two adjacent second electrodes are connected to form a stripe-shaped second electrode.

8. The touch control display panel according to claim 7, wherein:
   the stripe-shaped second electrode is extending along the column direction of the first substrate.

9. The touch control display panel according to claim 7, wherein:
   the stripe-shaped second electrode is extending along the row direction of the first substrate.

10. The touch control display panel according to claim 1, wherein:
    the third electrode is a planar transparent indium tin oxide (ITO) electrode entirely coated on the second substrate.

11. The touch control display panel according to claim 1, further including:

a black matrix, wherein an orthogonal projection of the black matrix onto the second substrate covers an orthogonal projection of the third electrode onto the second substrate.

12. The touch control display panel according to claim 11, wherein:
the third electrode is a transparent ITO electrode or a metal mesh electrode.

13. The touch control display panel according to claim 1, wherein the first substrate further includes:
a plurality of first of first wires connected to the controlling unit and the first electrodes; and
at least one second wire connected to the controlling unit and the second electrodes.

14. The touch control display panel according to claim 13, wherein:
the first wires and the at least one second wire are disposed in a same layer.

15. The touch control display panel according to claim 1, wherein:
the first electrodes and/or the second electrodes are multiplexed as a common electrode.

16. A touch control display device comprises the touch control display panel according to claim 1.

17. A touch control display panel, comprising:
a first substrate;
a second substrate arranged opposite to the first substrate;
a plurality of first electrodes disposed on the first substrate and extending in a column direction and a row direction of the first substrate;
a plurality of second electrodes disposed in a gap between two first electrodes and electrically insulated from the first electrodes, wherein the plurality of first electrodes and the plurality of second electrodes are disposed in a same layer, and the plurality of first electrodes are one-to-one corresponding to the plurality of second electrodes;
a third electrode disposed on the second substrate, wherein an orthogonal projection of the third electrode on the first substrate is at least overlapped with an orthogonal projection of the second electrodes on the first substrate; and
at least one controlling unit connected to the first electrodes, the second electrodes and the third electrode,
wherein a second electrode is disposed surrounding a corresponding first electrode, and at least two adjacent second electrodes are connected to form a grid second electrode.

18. A driving method for a touch control display panel comprising a first substrate; a second substrate arranged opposite to the first substrate; a plurality of first electrodes disposed on the first substrate and extending in a column direction and a row direction of the first substrate, a plurality of second electrodes disposed in a gap between two first electrodes and electrically insulated from the first electrodes, wherein the plurality of first electrodes and the plurality of second electrodes are disposed in a same layer; a third electrode disposed on the second substrate, wherein an orthogonal projection of the third electrode on the first substrate is at least overlapped with an orthogonal projection of the second electrodes on the first substrate; at least one controlling unit connected to the first electrodes, the second electrodes and the third electrode; and a conductive frame adhesive connected to the third electrode and the at least one controlling unit, wherein the method comprises:
in a display stage, providing a common voltage signal to the first electrode and/or the second electrodes, and providing a first constant reference signal to the third electrode or leaving the third electrode floated; and
in a touch stage, providing a touch controlling driving signal to the first electrodes and the second electrodes, and a second constant reference signal to the third electrode, wherein according to the touch controlling driving signal, the first electrodes generate a touch sensing signal to realize a touch position detection, and according to the touch controlling driving signal, the second electrodes generate a force touch sensing signal to realize a force touch.

19. The driving method according to claim 18, wherein:
the second constant reference signal is the same as the first constant reference signal.

20. The driving method according to claim 18, wherein:
the second constant reference signal is different from the first constant reference signal; and
the second constant reference signal is the same as the common voltage signal.

* * * * *